US010044520B1

(12) United States Patent
Devereaux et al.

(10) Patent No.: US 10,044,520 B1
(45) Date of Patent: Aug. 7, 2018

(54) COMPUTER MONITORING SYSTEM, APPARATUS AND METHOD FOR MONITORING APPLIANCE OPERATION

(71) Applicant: United Services Automobile Association ("USAA"), San Antonio, TX (US)

(72) Inventors: Ramsey Devereaux, San Antonio, TX (US); Cristin Gray, San Antonio, TX (US); Shane Tracey, San Antonio, TX (US); Amber K. Buehrle, Phoenix, AZ (US)

(73) Assignee: United Services Automobile Association ("USAA"), San Antonio, TX (US)

( * ) Notice: Subject to any disclaimer, the term of this patent is extended or adjusted under 35 U.S.C. 154(b) by 169 days.

(21) Appl. No.: 15/153,378

(22) Filed: May 12, 2016

Related U.S. Application Data

(60) Provisional application No. 62/160,408, filed on May 12, 2015.

(51) Int. Cl.
*H04L 12/28* (2006.01)
*H04L 12/26* (2006.01)

(52) U.S. Cl.
CPC ...... *H04L 12/2823* (2013.01); *H04L 43/0823* (2013.01); *H04L 43/0876* (2013.01)

(58) Field of Classification Search
CPC .................................................. H04L 12/2823
USPC .......................................................... 709/224
See application file for complete search history.

(56) References Cited

U.S. PATENT DOCUMENTS 8,649,987 B2 * 2/2014 Steenberg .......... G05B 23/0235
702/61

* cited by examiner

*Primary Examiner* — Adnan Mirza
(74) *Attorney, Agent, or Firm* — Locke Lord LLP; Christopher J. Capelli

(57) ABSTRACT

A system and method to monitor individual appliance performance. A monitor module is provided for aggregating data from a plurality of appliances wherein the module includes. Included in the monitor device is a gateway device configured to capture operational data relating to each of the plurality of appliances and an analyzing device configured to determine individual operational characteristics for each of the appliances from analysis of the captured operational data. A notification device is further provided which is configured to provide information to a user regarding the determined operational characteristics for each of the appliances.

19 Claims, 4 Drawing Sheets

COMPUTER MONITORING SYSTEM, APPARATUS AND METHOD FOR MONITORING APPLIANCE OPERATION

CROSS REFERENCE TO RELATED APPLICATIONS

This application claims priority to U.S. Patent Application Ser. No. 62/160,408 filed May 12, 2015 which is incorporated herein by reference in its entirety.

FIELD OF THE INVENTION

The disclosed embodiments generally relate to monitoring appliance operation, and more particularly, to an electronic control system for providing centralized monitoring of appliances.

BACKGROUND OF THE INVENTION

With regards to electrical, water and gas appliances, a primary problem exists with regards to damage caused by faulty appliances and/or inefficient operation. A tertiary problem is that a device does not currently exist which monitors various appliances and appliance types in a household over time to determine if their fitness is deteriorating, determine their level of operating efficiency and ways to improve it and/or provide intelligence on the failing appliance sub-component and how to repair it.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method to monitor individual appliance performance is described in which a monitor module is provided for aggregating data from a plurality of appliances wherein the module includes. Included in the monitor device is a gateway device configured to capture operational data relating to each of the plurality of appliances and an analyzing device configured to determine individual operational characteristics for each of the appliances from analysis of the captured operational data. A notification device is further provided which is configured to provide information to a user regarding the determined operational characteristics for each of the appliances.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
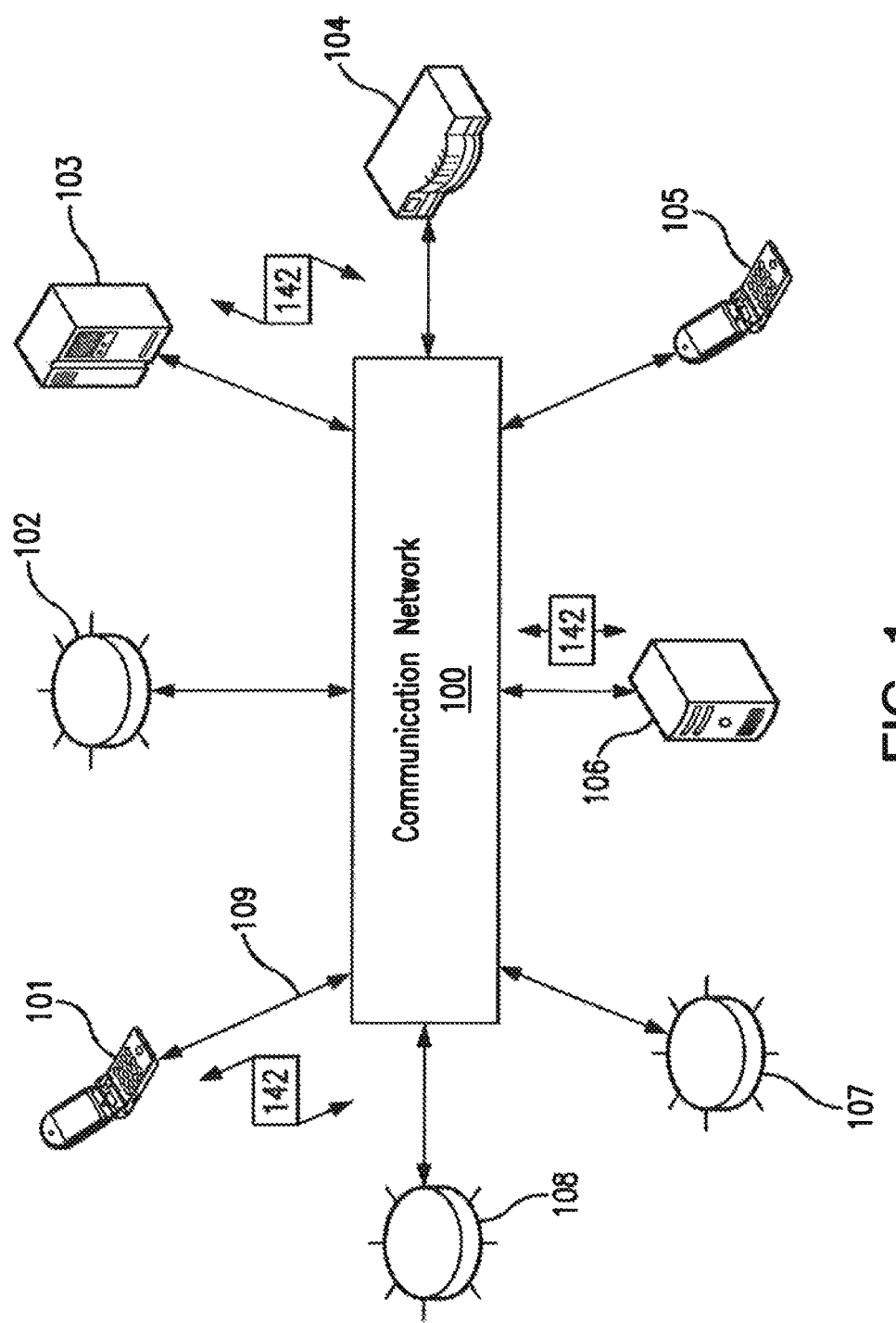
FIG. 1 illustrates an example communication network used in conjunction with one or more illustrative embodiments.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below preferably include a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, gaming/media consoles, smart watches, smart wristbands, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
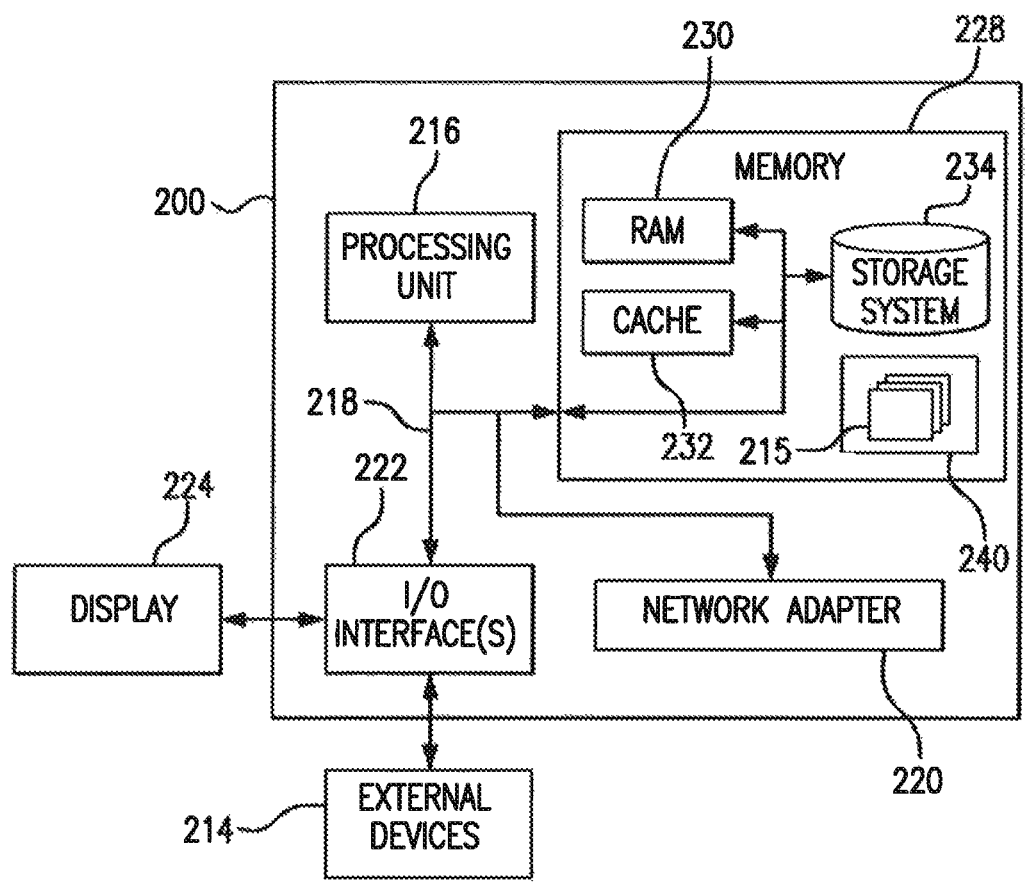
FIG. 2 illustrates an example computer controlled network device/node used in conjunction with one or more illustrative embodiments.

FIG. 2 is a schematic block diagram of an example network computing device 200 (e.g., an appliance monitor module) (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Monitor module 200 is intended to represent any type of computer system capable of carrying out the teachings of various embodiments of the present invention. Monitor module 200 is only one example of a suitable system and is not intended to suggest any limitation as to the scope of use or functionality of embodiments of the invention described herein. Regardless, monitor module 200 is capable of being implemented and/or performing any of the functionality set forth herein.

Monitor module 200 is operational with numerous other general purpose or special purpose computing system environments or configurations. Examples of well-known computing systems, environments, and/or configurations that may be suitable for use with monitor module 200 include, but are not limited to, micro-controllers, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Monitor module 200 may be described in the general context of computer system-executable instructions, such as program modules, being executed by a computer system. Generally, program modules may include routines, programs, objects, components, logic, data structures, and so on that perform particular tasks or implement particular abstract data types. Monitor module 200 may be practiced in distributed data processing environments where tasks are performed by remote processing devices that are linked through a communications network. In a distributed data processing environment, program modules may be located in both local and remote computer system storage media including memory storage devices.

Monitor module 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Monitor module 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive") and from remote located database (e.g., "cloud" based storage devices). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other media (e.g., a USB storage device) can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Monitor module 200 may also communicate with one or more external devices 214 (either via a wired connection or wireless), such as a keyboard, smart phone device, a pointing device, a display 224, etc.; one or more devices that enable a user to interact with monitor module 200; and/or any devices (e.g., network card, modem, etc.) that enable monitor module 200 to communicate with one or more other computing devices. Such communication can occur via Input/Output (I/O) interfaces 222. Still yet, monitor module 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
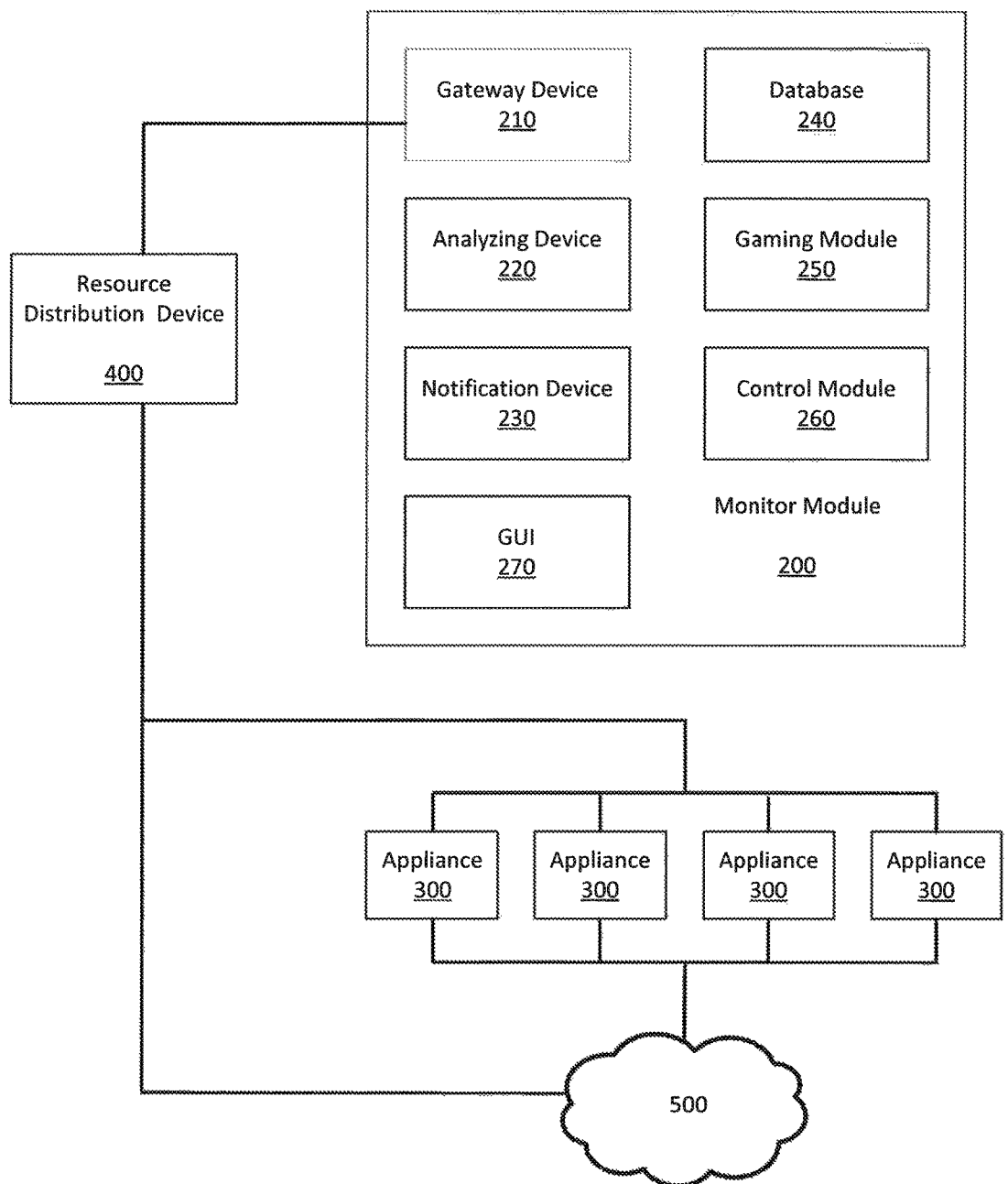
FIG. 3 illustrates an illustrative embodiment.

With the exemplary communication network 100 (FIG. 1) and monitor module 200 (FIG. 2) being generally shown and discussed above, description of certain illustrated embodiments of the present invention will now be provided. With reference now to FIG. 3 it is to be understood and appreciated significant development and use of "smart home" related technologies have been made and the smart home sector is advancing rapidly. The illustrated embodiments provide a hardware and software control system operational and configured to provide centralized monitoring and/or control of appliance devices, preferably from aggregated appliance data. It is to be understood, appliance devices 300 as referred to herein consists of resourcing consuming devices that consume one or more or electricity, water, gas and oil (hereinafter collectively referred to as "resources"). Examples include (and are not limited to): HVAC systems, compressor systems, clothes dryers, clothes washers, water management systems, dishwashers, cooking ovens, media and entertainment systems, cooking ranges (gas and electric), lighting systems, household appliances (coffee makers, toasters, other plug-in devices); personal and/or portable computer systems and devices; water heaters; refrigerators and other appliance configurations configured to consume one or more resources (e.g., electricity, water, gas and/or oil). The appliances 300 may be associated with a household or a commercial establishment. The appliances 300 may also be associated with a predetermined grouping of households 300 (as discussed further below).

Each appliance 300 is preferably operatively coupled to one or more resource distribution devices 400 configured and operable to deliver energy resources (e.g., electricity, water, gas and/or oil) to the coupled appliances. For instance, an exemplary resource distribution devices 400 may include an electrical fuse box, a water metering device and/or a gas metering device. For ease of description and illustration purposes, only a single resource distribution device 400 is shown, however it is to be understood the present invention may encompass use of various types of resource distribution devices 400 to each deliver a specified resource type (e.g., electricity, water, gas and/or oil).

The monitor module 200 in accordance with an illustrated embodiment preferably includes one or more of a: gateway device 210; analyzing device 220; notification device 230; database 240; gaming module 250 and a control module 260, the functionality of each is briefly described below. It is to be appreciated, each aforesaid component may exist as a standalone component (as illustrated in FIG. 3), or may be combined with one another.

Starting with the gateway device 210, it is preferably configured and operative to operably couple to the one or more resource distribution devices 400 to capture operational data relating to one or more of the appliances 300. Such operational data may include one or all operating parameters of an appliance (e.g., resource consumption, resource consumptions rate, operation load levels, operation time periods, operation efficiency and the like). It is to be appreciated the gateway device may be hardwired to the one or more resource distribution devices 400 and/or appliance devices 300, or alternatively may be connected thereto wirelessly through any known network means (e.g., WAN, LAN, WiFi, Bluetooth, NFC, cellular, the Internet, or any other suitable ad-hoc network type) including usage of a "cloud" based service systems 500.

Monitor module 200 further includes analyzing device 220 preferably configured and operative to determine individual operational characteristics for one or more of the appliances 300 via analysis of captured operational data, preferably via data disaggregation techniques (as further described below). Notification device 230 is preferably configured and operative to provide information (e.g., via a GUI, text message, email and the like) to a user (e.g., homeowner, building manager or other designated individuals) regarding determined operational characteristics for the one or more appliances 300.

The monitor module 200 further preferably includes a database 240 containing expected operating thresholds formed from individual appliance power consumption for the one or more appliances 300 (e.g., electrical, water or gas use and run time data). The database 240 is configured and operational to interact with the notification device 230, for instance, to alert a user upon variation of individualized operational data from expected operating thresholds for the one or more appliances 300. It is to be appreciated the analyzing device 220 and database 240 may be Internet-based (e.g., "cloud" based 500) and thus located remote from the gateway device 210 so as to be arranged in communication with the gateway device 210 to receive and process captured operational data regarding the one or more appliances 300. It is to be further appreciated the analyzing device 220 and database 240 may be configured and operational to determine operational characteristics of appliances 300 from a plurality of different households, the significance of which will be appreciated below. The significance of which will also be appreciated from the below description, the database 240 may include stored information relating to a specific appliance type, data may include historically-compiled data filtered through a statistical analysis. The database 240 may still further include a second database having commercially-available operational data for a range of appliances and a third database having recommendations data enabling the analysis device 220 to compare appliance operational data with both the historically-compiled data and commercially-available operational data to provide a recommendation in conjunction with notifying a user.

A gaming module 250 may be further included (or operatively coupled to) monitor module 200 that is preferably configured and operative to provide gamification (electronic gameplay) utilizing the determined individual operational characteristics of one or more appliances 300. Examples of such gaming scenarios may include different members of a household challenging one another, different households challenging one another, or households may be grouped together to form teams which challenge one another (examples of teams include neighborhoods, members of a type of military service grouped together (e.g., Army, Navy) or other designated team types/categories).

A control module 260 may be further included (or operatively coupled to) monitor module 200 that is preferably configured and operative to control overall and individual resource consumptions by one or more appliances 300 in accordance with the teachings of one or more illustrated embodiments.

Additionally, monitor module 270 may be configured and operative to generate a graphical user interface configured (in association with the analyzing device 220) to: gather contextual information related to user activity and a daily schedule; gather information about user comfort and service preferences; display energy/water/gas use feedback to a user; display energy/water/gas saving opportunities in compliance with a user's evolving behavior; recommend use of renewable energy source and stored energy within a household; and display incentive or motivational information to a user based on observed energy/water/gas use behavior and adaptive to a user's energy/water/gas use pattern.

The aforesaid monitoring device 200 may be further configured to monitor a household's occupant activity levels, appliance usage, water and gas usage, for configuring an appliance, water or gas source use schedule to achieve energy/water/gas savings associated with home operation. Additionally, the monitoring device 200 is further configured to detect and determine a life event change by detecting usage variations for one or more of electricity, water and gas consumption to determine a life change event in a dwelling (e.g., birth, death, divorce, child off to college, bought a new electric car that they charge into the home, bought a new appliance that needs a warranty, etc.).

Figure 4:
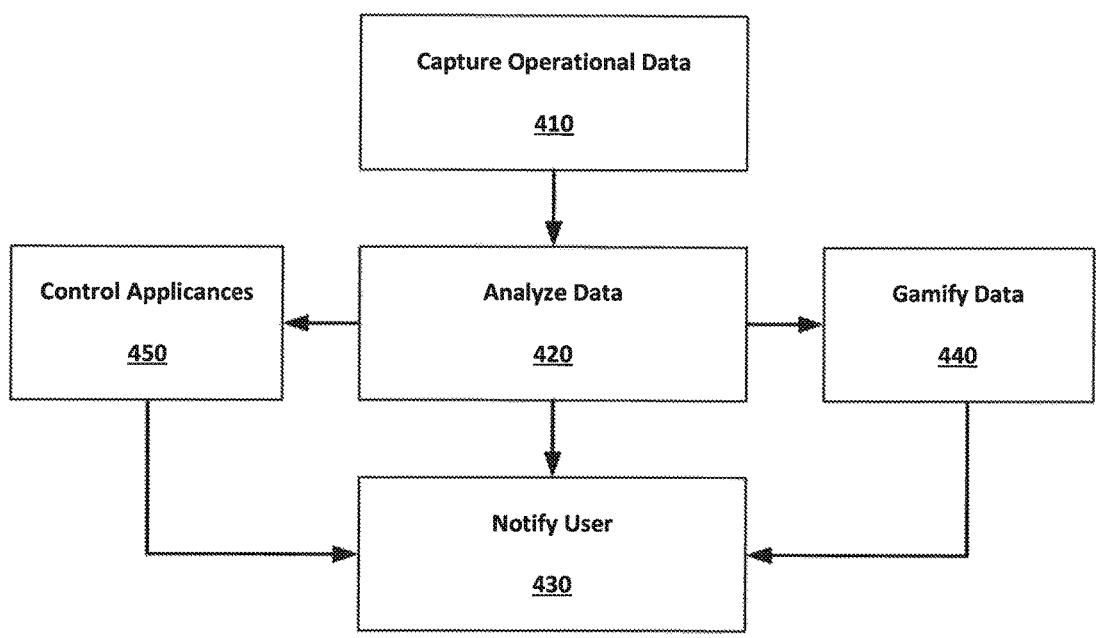
FIG. 4 illustrates a flow diagram depicting operation of an illustrative embodiment.

With reference now to FIG. 4, shown is a flow chart demonstrating implementation of the various exemplary embodiments. It is noted that the order of steps shown in FIG. 4 is not necessarily required, so in principle, the various steps may be performed out of the illustrated order. Also certain steps may be skipped, different steps may be added or substituted, or selected steps or groups of steps may be performed in a separate application following the embodiments described herein.

With reference to FIG. 4 (and with continuing reference to FIG. 3), starting at step 410, operational data from one or more appliance devices (300) is captured, and preferably aggregated, via preferably the gateway device (210) coupled to one or more resource distribution devices (400), as discussed above. Next, at step 420, the captured operational data is analyzed, preferably in a de-aggregated state, preferably in the analyzing device (220) to determine operational characteristics of the one or more appliances (300), as mentioned above. It is noted in an illustrated embodiment, the aforesaid analyzed data (step 420) may be gamified, via gaming module 250, to present various electronic gaming scenarios as discussed above, step 440. Additionally, it is noted in another illustrated embodiment, the aforesaid analyzed data (step 420) may be utilized to control one or more operational aspect of the one or more appliances (300) via gaming module 250, as also discussed above, step 450. Notification is then provided to a user in step 430, providing notice, and possibly action items to take, based upon the aforesaid analysis of aggregated data for operational characteristics for one or more appliances (300), as mentioned above with reference to FIG. 3.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system to monitor individual appliance performance, comprising
   a monitor module for aggregating data from a plurality of appliances wherein the module includes:
      a gateway device configured to capture operational data relating to each of the plurality of appliances;
      an analyzing device configured to determine individual operational characteristics for each of the appliances from analysis of the captured operational data; and
      a notification device configured to provide information to a user regarding the determined operational characteristics for each of the appliances; and
      a gaming module configured to provide electronic gameplay whereby the determined appliance individual operational characteristics associated with a user is compared
   against determined appliance individual operational characteristics associated with at least one
   other user.

2. A system as recited in claim 1, wherein each appliance is chosen from a group of appliances capable of consuming one or more of electricity, water and gas resources.

3. The system as recited in claim 1, wherein the gateway device
   is communicatively coupled to a circuit breaker device which is communicatively coupled to each of the plurality of appliances.

4. The system as recited in claim 1, wherein the gateway device
   is communicatively coupled to a computer server which is communicatively coupled to each of the plurality of appliances.

5. The system as recited in claim 1, wherein the appliances are chosen from the group consisting of at least a lighting system/component, clothes dryer, washing machine, dishwasher, video/audio device and HVAC device.

6. The system as recited in claim 1, further including a database
   having prescribed operating appliance thresholds regarding resource consumption and operating time data, wherein the database is operational to interact with the notification device such that the notification device alerts a user upon determined variation of individualized operational data from expected operating thresholds regarding appliance operation.

7. The system as recited in claim 1, further including a control
   module operatively coupled to the monitor module for controlling an operational aspect for each of the coupled appliances.

8. The system as recited in claim 7, wherein the monitoring device
   further comprises a graphical user interface and data processing apparatus, wherein the graphical user interface is configured to:
   gather contextual information related to user activity for each coupled appliance; gather information regarding user appliance service preferences; display appliance resource consumption; and
   display alternative modes of operation for the coupled appliances to mitigate resource consumption.

9. The system as recited in claim 1, wherein the monitoring device is
   further configured to detect and determine a life event change regarding a user for one of the coupled appliances by detecting certain usage variations regarding at least one coupled appliance.

10. A computer network based system to monitor individual
    appliance performance in a dwelling having one or more occupants, comprising:
    a network based computer server having a monitor module for aggregating data from a plurality of appliances wherein each appliance is coupled to the network and configured to provide data regarding aspects of its operation via its network coupling, the module includes:
- a gateway device communicatively coupled to each of the plurality of appliances via the internet and configured to capture operational data relating to each of coupled appliances;
- an analyzing device configured to determine individual operational characteristics for each of the coupled appliances via analysis of the captured operational data and to detect a life event change for at least one dwelling occupant by determining certain usage variations from one or more of the plurality of appliances indicative of a life event change; and
- a notification device coupled to the network based computer via the internet configured to provide information to a user regarding the determined operational characteristics for each of the appliances.

11. The network based system as recited in claim 10, wherein the
computer network includes the internet.

12. The network based system as recited in claim 10, wherein life event change is selected from the group consisting of: childbirth; death; divorce; and electric vehicle purchase.

13. The network based system as recited in claim 10, further including
a computing device coupled to the network, the computing device having a graphical user interface and data processing apparatus, wherein the graphical user interface is configured to:
gather contextual information related to user activity for each coupled appliance; gather information regarding user appliance service preferences; display appliance resource consumption; and
display alternative modes of operation for the coupled appliances to mitigate resource consumption.

14. The network based system as recited in claim 10, further including a database having prescribed operating appliance thresholds regarding resource consumption and operating time data, wherein the database is operational to interact with the notification device such that the notification device alerts a user upon determined variation of individualized operational data from expected operating thresholds regarding appliance operation.

15. The network based system as recited in claim 10, wherein each appliance is chosen from a group of appliances capable of consuming one or more of electricity, water and gas resources.

16. The network based system as recited in claim 10, wherein the appliances are chosen from the group consisting of at least a lighting system/component, clothes dryer, washing machine, dishwasher, video/audio device and HVAC device.

17. The network based system as recited in claim 10, further including a control module operatively coupled to the computer server for controlling an operational aspect for each of the coupled appliances.

18. The network based system as recited in claim 10, wherein the monitoring device is further configured to detect and determine a life event change regarding a user for one of the coupled appliances by detecting certain usage variations regarding at least one coupled appliance.

19. The network system as recited in claim 10, wherein the network computer server further includes a gaming module configured to provide electronic gameplay whereby the determined individual operational characteristics associated with an occupant is compared against determined individual operational characteristics associated with at least one other occupant.

* * * * *